(12) United States Patent
Strain

(10) Patent No.: US 7,854,119 B2
(45) Date of Patent: Dec. 21, 2010

(54) HYDROELECTRIC DEVICE

(76) Inventor: David Joseph Strain, 42 Roland La., Saint Peters, MO (US) 63376

( * ) Notice: Subject to any disclaimer, the term of this patent is extended or adjusted under 35 U.S.C. 154(b) by 388 days.

(21) Appl. No.: 11/774,597

(22) Filed: Jul. 7, 2007

(65) Prior Publication Data
US 2009/0008940 A1   Jan. 8, 2009

(51) Int. Cl.
F03G 6/00 (2006.01)
F03G 7/00 (2006.01)
F03D 9/00 (2006.01)
H02P 9/04 (2006.01)

(52) U.S. Cl. .......... 60/641.11; 60/641.15; 290/44; 290/55

(58) Field of Classification Search .......... 60/398, 60/641.8, 641.15; 290/43, 54, 55
See application file for complete search history.

(56) References Cited

U.S. PATENT DOCUMENTS

| | | | |
|---|---|---|---|
| 3,232,846 A | 2/1966 | Kimmerle | |
| 3,970,525 A | 7/1976 | Kurek | |
| 4,010,614 A | 3/1977 | Arthur | |
| 4,095,429 A * | 6/1978 | Morey | 60/675 |
| 4,201,059 A | 5/1980 | Feder | |
| 4,280,328 A * | 7/1981 | Falconer | 60/641.12 |
| 4,284,899 A | 8/1981 | Bendiks | |
| 4,341,490 A | 7/1982 | Keeling | |
| 4,382,365 A * | 5/1983 | Kira et al. | 60/675 |
| 4,391,100 A * | 7/1983 | Smith | 60/641.11 |
| 4,443,707 A * | 4/1984 | Scieri et al. | 290/4 R |
| 4,757,687 A | 7/1988 | Nasser | |
| 4,948,985 A | 8/1990 | Adams | |
| 5,729,981 A * | 3/1998 | Markus et al. | 62/3.4 |
| 5,873,249 A | 2/1999 | Alkhamis | |
| 6,000,880 A | 12/1999 | Halus | |
| 6,009,707 A | 1/2000 | Alkhamis | |
| 6,182,453 B1 * | 2/2001 | Forsberg | 62/125 |
| 6,434,942 B1 * | 8/2002 | Charlton | 60/641.11 |
| 6,861,766 B2 | 3/2005 | Rembert | |
| 6,945,063 B2 * | 9/2005 | Max | 62/235.1 |
| 2003/0024802 A1 | 2/2003 | Burgos | |
| 2004/0000165 A1 | 1/2004 | Max | |
| 2004/0182080 A1 | 9/2004 | Hendrix | |
| 2006/0242954 A1 | 11/2006 | Welch | |
| 2006/0290139 A1 | 12/2006 | Takeuchi | |

OTHER PUBLICATIONS

Drawing, Floating low pressure hydro turbine, Gunnar Ettestol, ETTE Elektro, 4985 Vegarshei, Norway.
Drawing, Floating Veritcal Hydro Power Turbine for Tidal Currents; Gunnar Ettestol, ETTE Elektro, Norway.

* cited by examiner

*Primary Examiner*—Thomas E Denion
*Assistant Examiner*—Christopher Jetton

(57) ABSTRACT

The present invention provides a hydroelectric device having a closed conduit portion extending along an elevational drop, with a turbine positioned at a lower elevation and in fluid communication with the closed conduit portion. The closed conduit portion contains a volume of fluid forming a pressure head therein, the fluid impacting the turbine in such a manner as to operate the turbine and produce electricity therefrom.

8 Claims, 4 Drawing Sheets

HYDROELECTRIC DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

As human societies become increasingly complex and populations grow, the demand for energy is ever-increasing. In modern societies, energy production relies in large part on non-renewable resources such as coal, oil, and natural gas. In addition to existing in finite supply, use of these products leads to formation of pollutants that raise environmental concerns. Burning coal and oil products, for example, leads to airborne pollutants including carbon dioxide. Natural gas, which is often thought to be largely pollutant-free, requires processing prior to use, and this processing produces airborne pollutants as byproducts. Further, the transport of oil and other petroleum products carries within it an inherent risk of pollution due to, for example, a leak in the transport vessel.

Alternate forms of energy production are proposed from time to time, each having various benefits and detriments. Biofuel or biomass energy sources, for example, are often proposed as solutions to the world's energy problems, in part because they represent largely renewable resources. Such fuels suffer from problems, however, in that they produce pollutants in many cases similar to that produced by the use of fossil fuels, and production of sufficient biomass to meet the world's energy demands seems unlikely and can, in some instances, compete directly with resources needed for the world's food supply.

Wind power is another method that produces no air pollution and is therefore an attractive source of energy production. Such a method, however, is less than desirable in areas where there is no constant source of wind. Furthermore, wind power units are seen as eyesores by many living in areas in which they have been implemented, and the devices have been known to affect bird migratory patterns and to present physical dangers to birds flying near them.

Nuclear energy holds promise in that the amount of energy produced from a small amount of material is great, and in that there is little or not air pollution produced by a nuclear power plant. Nuclear energy also has certain drawbacks, however, in that dangerous waste is produced and must be disposed of. In addition, uranium mining results in the release of greenhouse gases that lead to environmental concerns.

Hydroelectric energy is common in the form of hydroelectric dams, where water from, for example, a river is used to turn turbines or water wheels that are coupled to electrical generators. Such methods, however, may have a considerable environmental impact on the area surrounding the dam. Further, hydroelectric energy, as commonly used, requires a great deal of water and is not suitable for use in areas that, in fact, need water.

What is needed, therefore, is a pollution-free energy system that does not rely on wind conditions or geographical features of the landscape such as lakes or rivers, utilizes no dangerous substances, and requires no combustion. Further, such a device is desirable that also provides water to areas in need thereof, and which may also be used to effect at least some degree of climate control in a positive manner, as opposed to the negative effect exerted by many currently-used energy systems.

SUMMARY OF THE INVENTION

The present invention provides a hydroelectric device having a closed conduit portion extending along an elevational drop, with a turbine positioned at a lower elevation and in fluid communication with the closed conduit portion. The closed conduit portion contains a volume of fluid forming a pressure head therein, the fluid impacting the turbine in such a manner as to operate the turbine and produce electricity therefrom.

In another aspect of the present invention a collection portion is provided to collect fluid, such as rainwater, and direct the fluid into the closed conduit portion.

In another aspect of the present invention, and exit conduit is provided to direct fluid, such as water, leaving the turbine to a desired location.

In another aspect of the present invention a condenser portion is provided to condense water from the ambient atmosphere and direct the water into the closed conduit portion.

In another aspect of the present invention, a riser portion is provided to direct water or other fluid that has already left the turbine back to a higher elevation and into the closed conduit portion, where the water or other fluid can once again be used to operate the turbine.

In another aspect of the present invention, a heating portion is provided associated with the riser portion for heating fluid therein to a vapor state, the vapor traveling to a higher elevation in the riser portion and being directed back to the closed conduit portion, condensing to a liquid along the way.

In still another aspect of the present invention, a photovoltaic array is provided in electrical communication with the hydroelectric device, the photovoltaic array providing electricity for the operation thereof.

In still another aspect of the present invention, a steam turbine is provided along a length of the riser portion, steam flowing through the riser portion operating the steam turbine and thereby producing electricity.

In still a further aspect of the present invention, a wind turbine is provided in electrical communication with the hydroelectric device, the wind turbine providing electricity for the operation thereof.

DETAILED DESCRIPTION OF THE INVENTION

Figure 1:
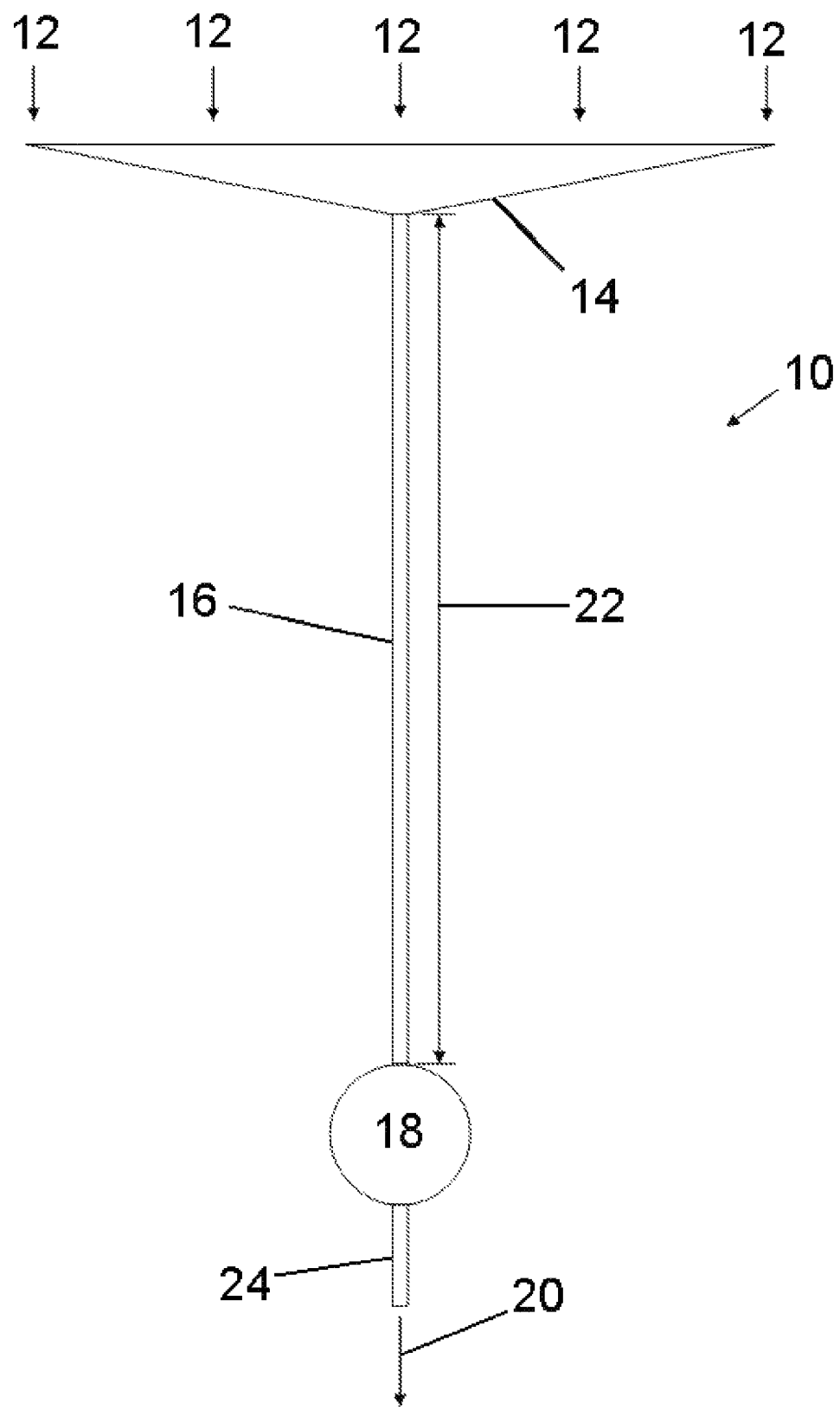
FIG. 1 is a schematic diagram of a collection embodiment of a hydroelectric device of the present invention.

Turning now to the drawings, wherein like numerals represent like parts, the numeral 10 represents generally one embodiment of a hydroelectric device constructed in accordance with the teachings of the present invention. This embodiment of the present invention is shown in FIG. 1 and may be referred to hereinafter as a collection tower embodiment of the present invention. Hydroelectric device 10 includes a collection portion 14, a closed conduit portion 16, and a generator portion 18.

Collection portion 14 of hydroelectric device 10 is adapted to collect water from rain impacting collection portion 14 (the rain being represented by arrows 12). Although collection portion 14 is shown in FIG. 1 as being dish-like in shape, it is contemplated that any suitable shape of collection portion 14 may be used, provided that the shape employed allows collection portion 14 to collect water in the form of falling rain. Likewise, collection portion 14 may be constructed from any suitable material, but is preferably constructed from a rigid material that is resistant to damage from rain and other elements. At the junction of collection portion 14 and closed conduit portion 16, an opening (not shown) is included such that rain water impacting collection portion 14 is directed toward the opening and, passing therethrough, into closed conduit portion 16.

Fixedly attached to collection portion 14 and extending substantially downward therefrom is closed conduit portion 16. Closed conduit portion 16 defines an elevational change between collection portion 14 and generator portion 18. This elevational change may be substantially vertical, or may exist at any suitable angle relative to collection portion 14 that allows the present device to function. The elevational change is preferably substantial, and closed conduit portion 16 may take any number of forms while still achieving its function. For example, closed conduit portion 16 may be a drilled conduit contained within a mountain, a pipe or similar structure suspended from an airborne structure, a solid structural pipe attached to a tower or descending along the surface of a hillside, or any other suitable structure that is able to contain the working pressure of the present device.

As rain water is collected in collection portion 14 and directed via an opening into closed conduit portion 16, a pressure head 22 develops due to the difference in elevation between the upper portions of closed conduit portion 16 and the lower portions thereof. The development of pressure head 22 provides potential energy that is available to perform work.

The collected water, retained under pressure in closed conduit portion 16, provides the energy necessary to operate generator portion 18, thereby producing electricity. Any suitable generator portion adapted for use with hydroelectric energy may be used in conjunction with the present device. It is preferred that a turbine be used for generator portion 18, although it is contemplated that one of skill in the art will be able to engage any suitable generator with the present device upon reading this disclosure.

After passing through generator portion 18 and performing work, water preferably exits the present system via exit conduit 24 as shown by arrow 20. The water leaving the system via exit conduit 24 may be stored, transported to another location for other uses, or, as will be explained with respect to other embodiments of the present invention described below, may be recycled for continued use in the present device.

As noted above, FIG. 1 provides a schematic diagram of one embodiment of the present system, and it is contemplated that one of skill in the art could produce the present device upon reviewing this disclosure. Various factors should, however, be taken into consideration when constructing any given system as shown in FIG. 1, and these factors are now discussed in greater detail.

Initially, it is necessary to determine the demands to be placed on the system for any given use thereof. Because hydroelectric device 10 relies on water collection for the production of energy, it is important to determine the amount of water and energy required per unit of time. Thus, the dimensions of the present system may be varied according to the requirements on the system. One method of determining the requirements placed on the system is to establish the per capita water and electricity consumption in an area to be serviced by the present device (which can not only be used to produce electricity from collected water but to then deliver the collected water to the surrounding area for other uses). A typical value for water consumption, for example, may be one hundred twenty-five gallons per capita per day. Determining the required water and electricity output for a given area is well within the ordinary skill in the art.

Once the required output of water and electricity is calculated for a given system, the parameters of collection portion 14 may be established for a given hydroelectric device 10. Using meteorological records, one can determine how much precipitation, on average, can be expected to fall on a given unit of surface area in the vicinity of device 10 over a given time interval. Thus, for example, the amount of water that can be expected to fall over a given unit of surface area of collection portion 14 in a given day can be determined. This value, for purposes of the following calculation, is designated 'g.' The number of gallons of water required to be collected by an entire collection portion 14 in a given day is designated "G." Thus, the formula for determining the required size in square feet, $A_c$ of collection portion 14 for a given location is as follows:

$$A_c = G/g$$

This is the number of gallons per day required from hydroelectric device 10 divided by the number of gallons that will, on average, fall on a given square foot of collection portion 14 in a given day.

The formula above allows sizing of collection portion 14 for the water requirements to be placed on a given hydroelectric device 10. In addition, however, collection portion 14 and closed conduit portion 16 must be designed to meet the energy requirements placed on device 10. As noted previously, the energy production requirement for a given area in a given day can be determined as already known in the art. Once this figure is known, the required number and size of generators to be associated with the present device 10 can be determined, because the generators used with a given device 10 must be able to output the required watts per day of energy. As will be discussed more fully below, it may be desirable to use a larger number of small generators with the present device, rather than a small number of large generators.

The amount of energy produced by device 10 per unit of time is a direct function of the height of pressure head 22, or, put another way, the working pressure available to the system at the elevation of generator portion 18 and the flow rate through generator portion 18. These variables are determined by, among other things, the distance between collection portion 14 and generator portion 18. To produce the desired amount of energy, collection portion 14 must be sized to collect enough water per unit of time to meet the demands of generator portion 18 and must be positioned far enough above generator portion 18 to meet the pressure head demand of generator portion 18. Generators are typically designed for an optimum head height and flow rate, so it is preferred that both of these criteria are taken into consideration.

It is preferred that the hydroelectric device 10 be optimized to provide the maximum possible energy output per unit of area of the system. It is also preferred that the amount of land area utilized by the present device 10 is minimized. In other words, it is preferred that hydroelectric device 10 be constructed to utilize the maximum practical head height coupled with the smallest possible plan area. In order to achieve this goal, it is preferred that generator portions 18 be placed at several heights along closed conduit portion 16, rather than simply at one position near the bottom of closed conduit portion 16 as shown in the exemplary schematic in FIG. 1. Thus, whether closed conduit portion 16 takes the form of a tower, a conduit running through a mountain or along a hillside, or a vertical drop, generator portions 18 may be placed at vertical stages along the drop.

For example, one embodiment of hydroelectric device 10 may have twenty-four hundred feet of usable working height along the length of closed conduit portion 16. This may be divided into four separate six hundred foot pressure head stages spaced along closed conduit portions 16, with generator portions 18 placed at or near ground level, as well as at six hundred feet, twelve hundred feet, eighteen hundred feet. These generator portions 18, then, would have practical working head heights of at least several hundred feet, with outputs capable of meeting the energy demands on the overall system, and the number of generator portions 18 employed would be that which is sufficient to meet the required output energy demand on the system per unit of time.

Based on the above information, off-the-shelf, known components such as generators, piping, valves, and the like can be chosen for use with hydroelectric device 10, and the selection of such components would be within the abilities of one of ordinary skill in the art upon reading this disclosure. Further, based on the above, the dimensions of collection portion 14 can be established. The distribution of water and electricity from hydroelectric device 10 falls within well-known engineering processes as of the time of this writing.

It is contemplated that the present system may be utilized in a region where precipitation is insufficient to meet the energy demands of the surrounding area based on the design of the present device shown in FIG. 1, or that such precipitation is sufficiently sporadic that the embodiment of the present device shown in FIG. 1 cannot be relied upon to meet the daily energy needs of the area. With this problem in mind, a second embodiment 100 of the present device is provided and shown in FIG. 2, this embodiment provided with the necessary functionality to accumulate sufficient quantities of water in the absence of precipitation.

Figure 2:
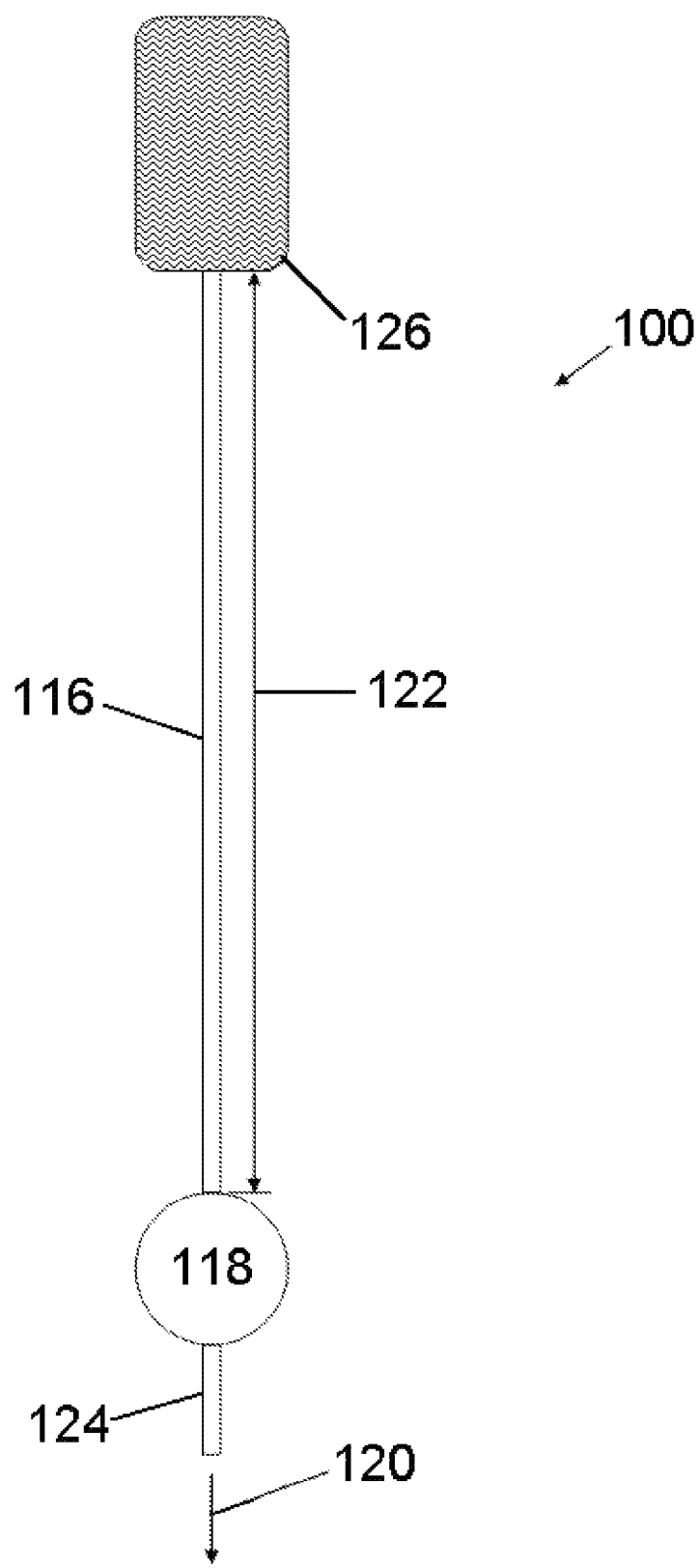
FIG. 2 is a schematic diagram of a condensation embodiment of a hydroelectric device of the present invention.

Hydroelectric device 100, shown in schematic form in FIG. 2, includes a condenser portion 126 that is able to use the humidity in the ambient air to produce water in liquid form. This embodiment of the present invention may be referred to herein as a condensation embodiment. Once this water has been produced, it is available to hydroelectric device 100 in much that same way water collected by collection portion 14 is available to hydroelectric device 10 in FIG. 1 and described above. Condenser portion 126 is preferably fixedly attached to a closed conduit portion 116 in such a manner that water produced by condenser portion 126 is directed into closed conduit portion 116. As with the embodiment of the present device described above, closed conduit portion 116 may take any of a variety of suitable forms.

Once water has been directed into closed conduit portion 116, a pressure head 122 forms due to a vertical elevation drop between condenser portion 126 and generator portion 118. Pressure head 122 is available to do work, namely to operate generator portion 118, thereby producing electricity. The electricity produced can be delivered to any desired location, whereupon it can be put to use. Likewise, water produced by condenser portion 126, having flowed through the present device and operated generator portion 118, preferably exits the present device via exit conduit 124 and can then be delivered to a desired location for other uses.

As with the embodiment of the present device described with respect to FIG. 1, various considerations must be taken into account in designing a hydroelectric device 100 in accordance with the teachings of the present invention. As previously described, the amount of water and electricity required per unit of time must be determined so that the resulting hydroelectric device 100 is able to meet the electricity and water needs of the area in which it is to be used.

Once the water and electricity demand on hydroelectric device 100 has been determined, an appropriate condenser portion 126 may be selected. Condenser portion 126 may collect water from the surrounding air by condensing humidity therein, or may even condense moisture in clouds to produce water. Meteorological records may be used to determine how much water, on average, can be expected to be condensed by condenser portion 126 from a given volume of air at a given location. Knowing the average daily relative or absolute humidity at an elevation at which condenser portion 126 is to be used allows calculation of the volume of air that must be processed and dehumidified per day in order to produce the desired volume of water.

Condensers already available on the market may be evaluated for use with a given hydroelectric device 100. Based on the required water and electricity production at a given location, any or all of the presently available condensers may be used in conjunction with a hydroelectric device 100 at one location or another. Candidate condensers may be evaluated and ranked based on their output ratings in gallons per day for a given water vapor content per unit volume of air processed. In some cases, depending on the design of condenser portion 126, it may be necessary to force air through condenser portion 126. In such instances, the average flow-through of air can be calculated to ensure that enough air is dehumidified to achieve the required water production rate, and based on this calculation the number of fans, ducts, or other structures designed to augment the flow of air into condenser portion 126 may be determined.

It is contemplated that, in cases where feasible, a single condenser portion 126 may be used in conjunction with hydroelectric device 100, as shown in FIG. 2. In other instances, however, multiple condenser portions 126 may be utilized in conjunction with a single hydroelectric device 100. Once the required water and electricity output for a given hydroelectric device 100 is determined, then the specifications of the condenser portions 126 can be used to determine how many condenser portions 126 must be employed to meet the output demand. Different regions, having different average humidity, pressure, and temperature, may require different designs and numbers of condenser portion 126. It is contemplated that the proper selection of type and number of condenser portions 126 is within the ordinary skill in the art upon reading this disclosure. Thus, the present device 100 can be varied to meet whatever requirements exist at a given location, as well as to work best with the meteorological conditions at a given location.

As with the embodiment of the present device shown in FIG. 1 and described above, an appropriate height of closed conduit portion 116 must be determined in order to achieve a desired pressure head 122 due to the elevation difference between condenser portion 126 and generator portion 118. The considerations that must be taken into account when determining this for hydroelectric device 100 are substantially the same as those described above with respect to hydroelectric device 10. Again it is contemplated that multiple generator portions 118 may be used, generator portions 118 being spaced along the length of closed conduit portion 116 such that a vertical drop exists between each individual generator and the next, allowing several practical working heights, and therefore pressure heads, to be established along the length of closed conduit portion 116 of a given hydroelectric device 100.

In the embodiments of the present hydroelectric device described above, water exits the system along an exit conduit, after operating a generator, and from there can be distributed to other locations for various uses. It is contemplated, however, that in some situations the present device may serve as an electricity-producing device only, and will not be needed for supplying water to the surrounding area. In such embodiments, water within the system may be conserved and recycled for use in operating a generator. One such embodiment of the present system is depicted in schematic form in FIG. 3.

Figure 3:
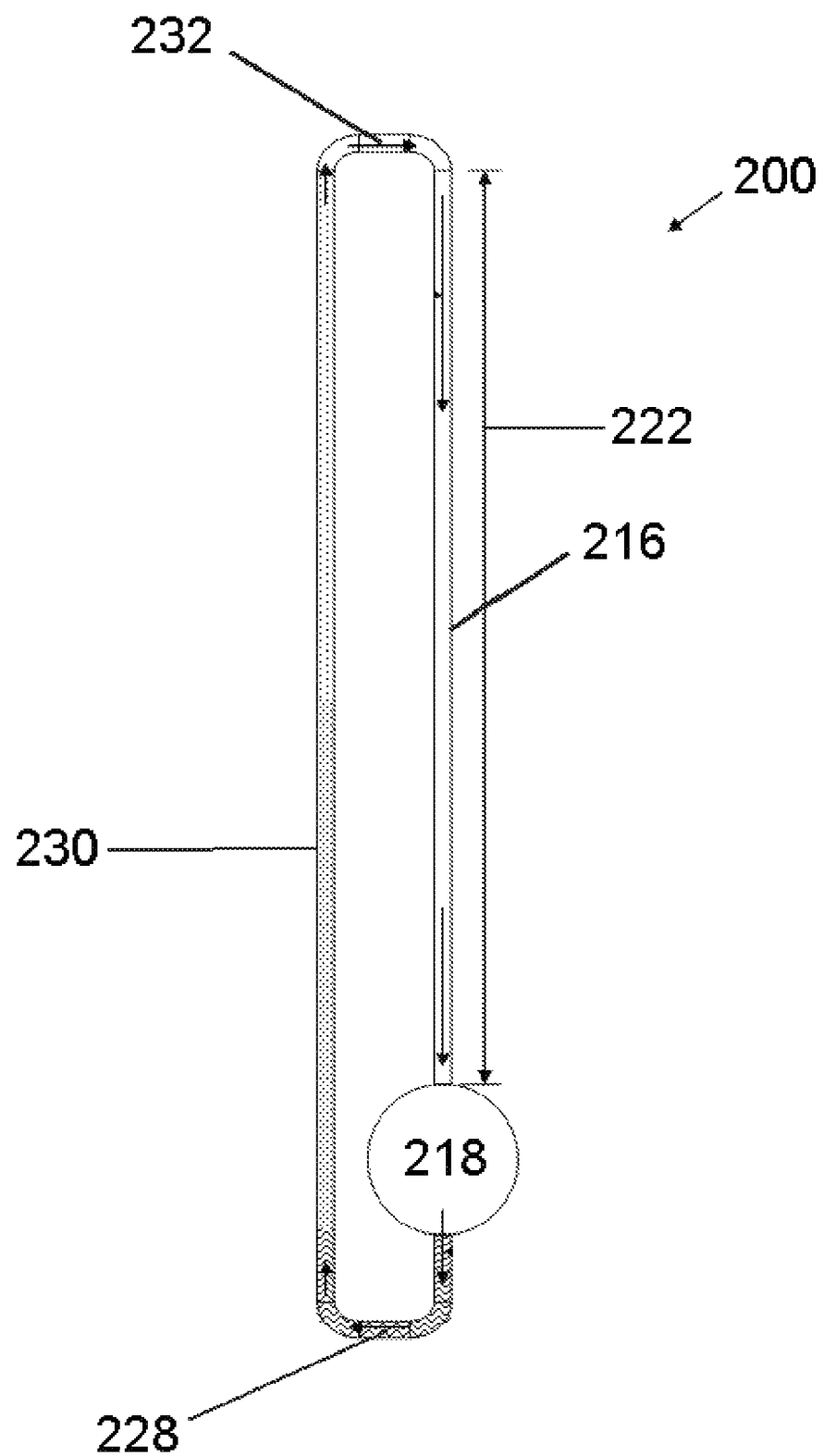
FIG. 3 is a schematic diagram of a percolation embodiment of a hydroelectric device of the present invention.

As shown in FIG. 3, a hydroelectric device 200 includes a closed conduit portion 216 that defines a vertical elevation above generator portion 218. This embodiment of the present invention may be referred to herein as a percolation embodiment. Water contained within closed conduit portion 216 forms a pressure head 222 due to the elevation difference between a top portion of closed conduit portion 216 and generator portion 218. The water contained within closed conduit portion 216 may be provided in any of the previously described ways (i.e. by a collection portion or a condenser portion) or in any other suitable way. Pressure head 222 acts on generator portion 218, which produced electricity therefrom.

After leaving generator portion 218, however, water is transported along first return conduit portion 228 to riser portion 230. Once in riser portion 230, water is percolated from a bottom portion thereof to a top portion thereof in the form of water vapor. As the water vapor reaches the top of riser portion 230 it passes through second return conduit portion 232 and back into closed conduit portion 216, whereupon it condenses and can be used once again to operate generator portion 218.

Water contained within riser portion 230 must be converted into water vapor that can then move upward along riser portion 230, through second return conduit portion 232, and into closed conduit portion 216, where it condenses into a liquid form. The conversion of water within riser portion 230 to water vapor can be achieved in any suitable manner, and it is contemplated that a number of suitable methods of accomplishing this will be apparent to those of skill in the art upon reading this disclosure. Heating of the water within riser portion 230 may be accomplished by, for example, use of solar panels operably engaged with the present device, use of wind power, use of geothermal power where available, or use of energy produced by the present system itself. It is preferred that any method used to heat water in riser portion 230 be substantially pollution-free.

As with the embodiments of the present device described with respect to FIGS. 1 and 2, various considerations must be taken into account in designing a hydroelectric device 200 in accordance with the teachings of the present invention. As previously described, the amount of water and electricity required per unit of time must be determined so that the resulting hydroelectric device 200 is able to meet the electricity needs of the area in which it is to be used. Both the required height of pressure head 222 and the volume flow through needed for generator portion 218 can be determined as described previously and optimized such that the present device provides the maximum possible energy output per unit of area used by the device. As discussed previously, multiple generator portions 218 may be utilized, spaced at intervals along the length of closed conduit portion 216.

After having determined the necessary height of pressure head 222, as well as the volume of flow required by one or more generator portions 218, the remainder of hydroelectric device 200 can be designed. Hydroelectric device 200 must direct enough energy to the water contained within riser portion 230 to boil the water into vapor. Furthermore, enough energy must be directed to the vapor along the entire length of riser portion 230 to ensure that the water vapor moves to the top of riser portion 230 and through second return conduit portion 232, whereupon it can condense and fall back into closed conduit portion 216 at the required flow rate. The energy required to do this can be calculated using steam tables, numerical equations, or computer simulation using computation fluid dynamics and heat transfer. These and other methods of performing the necessary calculations are within the ordinary skill in the relevant art.

Once the energy required to accomplish the percolation function of hydroelectric device 200 is determined, a chosen method of providing that energy to the present device may be determined. Preferred methods of providing this energy are solar power, geothermal power, and use of energy produced by hydroelectric device 200 itself.

Figure 4:
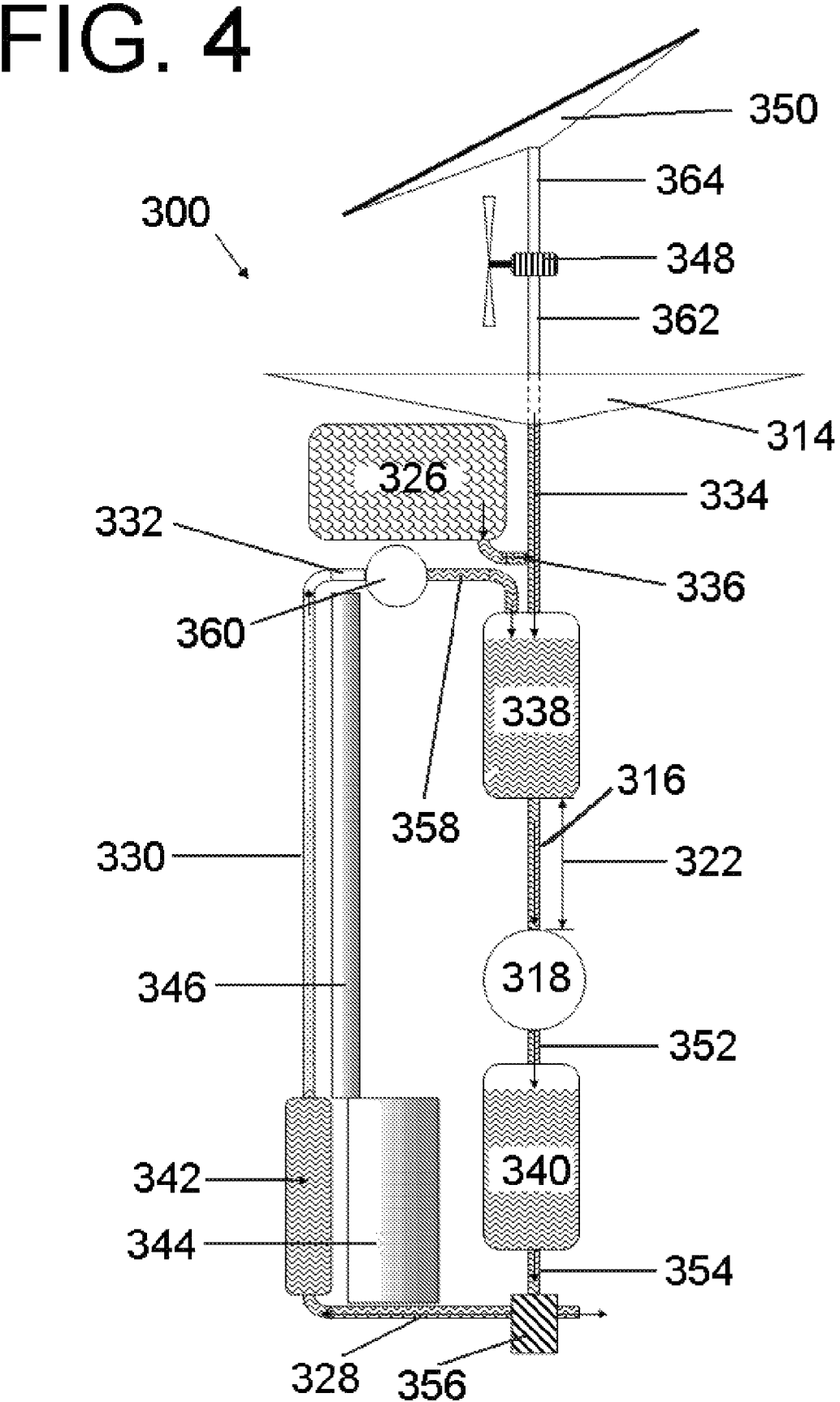
FIG. 4 is a schematic diagram of an alternate embodiment of a hydroelectric device of the present invention.

Using solar power, for example, may be accomplished by placing parabolic or other mirrors in such a manner as to be directed toward a percolation bulb (as shown in FIG. 4 and described with respect thereto). This percolation bulb is preferably positioned near the base of riser portion 230, and water within the bulb is maintained constantly at a boiling temperature. Smaller parabolic or other mirrors may be placed along the length of riser portion 230, and directed at riser portion 230, in order to maintain the water vapor therein at a sufficiently energetic state to pass over the top of riser portion 230 and through second return conduit 232. In order to determine the size of mirrors needed for use in conjunction with the present device, it is necessary to determine the average daily insolation in the region in which hydroelectric device 200 is being used, as well as the amount of energy that must be directed into the percolation bulb to boil water fast enough to provide the flow rate along closed conduit portion 216 required by generator or generator portions 218. Having determined these parameters, the necessary size and number of mirrors can be calculated as a function of the insolation and surface efficiency of the mirrors being used.

For any given hydroelectric device 200 there will exist minimum ratios as well as optimum ratios for the percolation bulb to riser portion 230 diameter, the mirror width to riser portion 230 diameter, the mirror width to percolation bulb diameter, and percolation bulb head to generator portion 218 head. These parameters should be sufficient to establish steady-state boil-off and vapor travel over the top of riser portion 230, along second return conduit portion 232, and down through closed conduit portion 216 and generator portion 218. These calculations are made using the regional average daily temperature at the elevation of generator portion 218 (or multiple generators) and based on how much backpressure on the percolation bulb is required to boil off and move up a given mass of water per unit time in the present system.

With the information above, it is possible to select off-the-shelf mirrors and generators, as well as riser, conduit, and other piping and valves for use with hydroelectric device 200.

It is believed that one of ordinary skill in the art will be able to construct a hydroelectric device 200 upon reading this disclosure.

The various components of the embodiments of the present device shown in FIGS. 1 through 3 and described above may be combined to produce a hydroelectric device 300 such as that shown in schematic form in FIG. 4. The embodiment of hydroelectric device 300 shown in FIG. 4 further includes additional components which are now described in greater detail.

A collection portion 314 is provided to collect water in the form of rain and direct it into first closed conduit portion 334. Rain impacting collection portion 314 is shown in the form of arrows 312. Once rain 312 has impacted collection portion 314, the shape of collection portion 314 causes the accumulated water to flow to an opening therein (not shown) where a top portion of first conduit portion 334 engages collection portion 314. The rainwater the flows down first closed conduit portion 334, whereupon it is directed to an upper reservoir 338.

Upper reservoir 338 includes an opening, preferably positioned at a bottom end thereof, where a second closed conduit portion 316 engages upper reservoir 338. As water accumulates in upper reservoir 338 and flows into second closed conduit portion 316, a pressure head 322 is formed within second closed conduit portion 316 (and, in fact, the water remaining within upper reservoir 338 may further contribute to this pressure, unless the opening in the bottom of upper reservoir 338 is closed such as with a valve). Pressure head 322 is available to do work, namely to operate generator portion 318 which is positioned at an elevation below that of upper reservoir 338 and the top portion of second closed conduit portion 316. As the water operates generator portion 318, electricity is produced therefrom.

After operating generator portion 318, water preferably passes through third closed conduit portion 352 and into lower reservoir 340 where it accumulates for further use by hydroelectric device 300 or, if desired, can be stored for future use. Water leaves lower reservoir 340 through third closed conduit portion 354. In the event hydroelectric device 300 has accumulated more water than is necessary, valve 356 may direct water out of hydroelectric device 300 for other uses. It is preferred, however, that valve 356 direct the water through first return conduit 328.

After passing through first return conduit 328 water passes into another reservoir referred to herein as percolation bulb 342. It is preferred that the water contained within percolation bulb 342 is maintained at a boiling temperature at all times, and is preferably maintained at this temperature by use of a first mirror 344, which serves to concentrate and direct solar energy at percolation bulb 342, thereby heating it. Boiling water contained within percolation bulb 342 is converted to water vapor (or, more specifically, pressurized steam), that then begins to rise along riser portion 330. A temperature is maintained along the length of riser portion 330 by second mirror 346, which serves to concentrate and direct solar energy at riser portion 330. This temperature maintenance ensures that the water vapor or steam contained within riser portion 330 remains in vapor form as it moves along the length of riser portion 330 and into second return conduit 332.

In the embodiment of hydroelectric device 332 shown in FIG. 4, a steam turbine 360 is provided between second return conduit 332 and third return conduit 358. Steam rising through riser portion 330 and moving into second return conduit 332 under pressure is available to do work, namely to operate steam turbine 360 and thereby produce electricity. The electricity so produced may be directed to a location in the surrounding area where it can be put to use, or may be retained to power various components of the present device. After passing through steam turbine 360, water vapor moves into third return conduit 358, which is not heated, whereupon it begins to condense into liquid water. This liquid water flows into upper reservoir 338 where it is positioned such that it may once again be used by hydroelectric device 300.

As can be seen from FIG. 4, the embodiment of hydroelectric device 300 shown includes additional components, namely condenser portion 326, wind turbine 348, and photovoltaic array 350. Condenser portion 326 operates in substantially the same manner as that described with respect to the embodiment of the present device shown in FIG. 2 and described above. Specifically, condenser portion 326 serves to supply additional water to hydroelectric device 300, the water being taken from the humidity of the ambient air or surrounding clouds.

Wind turbine 348 is preferably fixedly attached to a support portion 362 extending upwardly from collection portion 314. Wind turbine 348 may be any suitable wind turbine known in the art and serves to produce additional electricity from wind occurring at the upper elevations of hydroelectric device 300. The electricity produced therefrom preferably serves to meet the electricity requirements of hydroelectric device 300, namely the requirements of condenser portion 326.

Photovoltaic array 350 is preferably fixedly attached to a second support portion 364 extending upwardly from wind turbine 348. Any suitable photovoltaic array known in the art may used. Photovoltaic array 350 serves to produce electricity from solar energy, the electricity preferably being utilized to meet the electricity requirements of hydroelectric device 300 such as, for example, the electricity requirements of condenser portion 326.

It is contemplated that both a wind turbine 348 and photovoltaic array 350 may be used as shown in FIG. 4, and that wind turbine 348 and photovoltaic array 350 may be attached to hydroelectric device 300 in any suitable manner. It is further contemplated that either of wind turbine 348 or photovoltaic array 350 may be eliminated from given embodiments of the present invention, leaving the other electricity-producing mechanism to power, for example, condenser portion 326. Further, in some embodiments of the present invention both wind turbine 348 and photovoltaic array 350 may be eliminated and electricity production for condenser portion 326, for example, may be provided by steam turbine 360.

In constructing any given hydroelectric device 300, engineering decisions must be made regarding the parameters of the device. The various decisions, calculations, and determinations used in constructing a hydroelectric device 300 are substantially similar to those described with respect to the other embodiments of the present device, shown schematically in FIGS. 1 through 3 and described above. Once again the demands on a given hydroelectric device 300, both in terms of water and electricity, must be determined. Once a per capita daily water and electricity demand is determined, a single hydroelectric device 300, or multiple hydroelectric devices 300, may be utilized to meet those demands.

As with other embodiments described above, multiple generator portions 318 may be positioned at locations along second closed conduit portion 316, with each generator portion 318 having a likely head height of several hundred feet between it and the next generator. It is preferred that hydroelectric device 300, or indeed any of the embodiments of the present invention, be as tall as practically possible from a structural standpoint. As such, natural elevation features of the surrounding geography, such as mountains or hillsides, may be ideal in providing the necessary foundation to a hydroelectric device 300 extending along a substantial elevation. That said, it is contemplated that hydroelectric device 300 may, like the other embodiments of the present invention described above, be constructed in a free-standing form, with no mountain, hill, or other natural geographic feature being used to support the device along its elevation.

Although the embodiment of the present device shown in FIG. 4 includes only a single photovoltaic array 350, wind turbine 362, and collection portion 314, it is contemplated that a plurality of any or each of these may be positioned at various locations along hydroelectric device 300. Further, multiple reservoirs, riser portions, steam turbines, generators, and conduit systems may be used in any given embodiment of the present invention. The principles set forth herein may be adapted in numerous ways to provide various embodiments of the present hydroelectric device, each embodiment designed to meet the specific needs and requirements of the region in which the device is to operate. It is contemplated that each of these variations on the principles of the present invention are contained within the spirit and scope of the present invention as set forth herein.

In addition to the energy and water production features described above, it is further contemplated that the present device may be used to effect a degree of climate change on the surrounding area. The ability to move water on a large scale may impact shoreline loss due to global warming, and may be able to return water to continental interiors where water reserves may be low.

The drawings and description provided above are exemplary only and are not meant to limit the present invention. It is contemplated that various modifications to the embodiments of the present invention described above will be apparent to those of ordinary skill in the art upon reading this disclosure. It is contemplated that these variations are within the spirit and scope of the present invention, which is limited only by the claims that follow.

The invention claimed is:

1. A hydroelectric device comprising:
   a closed conduit portion extending from a first elevation to a second elevation;
   a generator positioned at said second elevation and in fluid communication with said closed conduit portion;
   a riser portion extending from a third elevation to a fourth elevation in fluid communication with a turbine such that a fluid passing through said turbine is directed into said riser portion;
   wherein said closed conduit portion contains a volume of fluid forming a pressure head therein, said fluid engaging said generator portion in such a manner as to operate said generator portion and produce electricity therefrom, and further wherein said riser portion is in fluid communication with said closed conduit portion at substantially a fourth elevation of said riser portion such that vaporized fluid moves from said riser portion into said closed conduit portion in such as manner as to condense to form a liquid for formation of said pressure head therein;
   at least one minor attached to said riser portion along a length thereof, said minor adapted to capture sunlight and direct said sunlight at said riser portion and thereby heating said riser portion, said mirror being able to rotate over the course of a day to capture a maximum amount of sunlight at any given time;
   a collection portion fixedly attached to said closed conduit portion at a first elevation, said collection portion adapted to collect fluid and direct said fluid into said closed conduit portion;
   a condenser portion fixedly attached to said closed conduit portion and in fluid communication therewith, said condenser portion adapted to condense water from an atmosphere surrounding said condenser portion and direct said water into said closed conduit portion;
   a photovoltaic array in electrical communication with at least said condenser portion of said hydroelectric device and positioned to receive sunlight over at least a portion of a day, at least a portion of a quantity of electricity produced by said photovoltaic array being directed to said condenser portion for the powering thereof;
   a first reservoir portion positioned along a length of said closed conduit portion and in fluid communication therewith, said first reservoir portion having a first reservoir inlet and a first reservoir outlet, wherein fluid flowing through said closed conduit portion enters said first reservoir portion via said first reservoir inlet and accumulates within said first reservoir portion, and further wherein fluid exits said first reservoir portion via said first reservoir outlet and is directed through a portion of said closed conduit portion to said generator portion, said fluid accumulated within said first reservoir portion contributing to said pressure head acting on said generator portion;
   an exit conduit in fluid communication with said generator portion such that fluid passing through said generator portion is directed into said exit conduit;
   a second reservoir portion positioned along a length of said exit conduit and in fluid communication therewith, said reservoir having a second reservoir inlet and a second reservoir outlet;
   a valve portion in fluid communication with said exit conduit, said valve having a first setting and a second setting, wherein fluid exiting said generator portion enters said second reservoir portion through said second reservoir inlet thereof and accumulates therein, and further wherein fluid accumulated in said second reservoir portion exits said second reservoir portion through said second reservoir outlet thereof, and further wherein when said valve is positioned at a first setting said fluid is directed into said riser portion, and when said valve is positioned at a second setting said fluid is directed away from said hydroelectric device for use outside of said device;
   a bulb portion positioned along a length of said riser portion and in fluid communication therewith, said bulb portion having an inlet and an outlet, wherein fluid flowing through said riser portion enters said bulb portion through said inlet and accumulates therein, and further wherein said heat-generation portion is adapted to heat said bulb portion, and further wherein, upon heating, fluid exits said bulb portion via said outlet and flows through a remaining portion of said riser portion;
   a steam turbine operably positioned along a length of said riser portion at an elevation wherein fluid within said riser portion is present in the form of steam as a result of the operation of said heat-generating portion, said steam engaging said steam turbine and said steam turbine producing electricity therefrom; and
   a wind turbine in electrical communication with at least said condenser portion of said hydroelectric device and positioned to be impacted by wind over at least a portion of a day, at least a portion of a quantity of electricity produced by said wind turbine being directed to said condenser portion for the powering thereof.

2. A hydroelectric device comprising:

a closed conduit portion extending from a first elevation to a second elevation;

a generator positioned at said second elevation and in fluid communication with said closed conduit portion;

a riser portion extending from a third elevation to a fourth elevation in fluid communication with a turbine such that a fluid passing through said turbine is directed into said riser portion;

wherein said closed conduit portion contains a volume of fluid forming a pressure head therein, said fluid engaging said generator portion in such a manner as to operate said generator and produce electricity therefrom, and further wherein said riser portion is in fluid communication with said closed conduit portion at substantially a fourth elevation of said riser portion such that vaporized fluid moves from said riser portion into said closed conduit portion in such as manner as to condense to form a liquid for formation of said pressure head therein;

at least one minor attached to said riser portion along a length thereof, said minor adapted to capture sunlight and direct said sunlight at said riser portion and thereby heating said riser portion, said mirror being able to rotate over the course of a day to capture a maximum amount of sunlight at any given time;

a condenser fixedly attached to said closed conduit portion and in fluid communication therewith, said condenser adapted to condense water from an atmosphere surrounding said condenser portion and direct said water into said closed conduit portion;

a photovoltaic array in electrical communication with at least said condenser of said hydroelectric device and positioned to receive sunlight over at least a portion of a day, at least a portion of a quantity of electricity produced by said photovoltaic array being directed to said condenser portion for the powering thereof;

a first reservoir portion positioned along a length of said closed conduit portion and in fluid communication therewith, said first reservoir portion having a first reservoir inlet and a first reservoir outlet, wherein fluid flowing through said closed conduit portion enters said first reservoir portion via said first reservoir inlet and accumulates within said first reservoir portion, and further wherein fluid exits said first reservoir portion via said first reservoir outlet and is directed through a portion of said closed conduit portion to said generator, said fluid accumulated within said first reservoir portion contributing to said pressure head acting on said generator;

an exit conduit in fluid communication with said generator portion such that fluid passing through said generator portion is directed into said exit conduit;

a second reservoir portion positioned along a length of said exit conduit and in fluid communication therewith, said reservoir having a second reservoir inlet and a second reservoir outlet;

a valve portion in fluid communication with said exit conduit, said valve having a first setting and a second setting, wherein fluid exiting said generator portion enters said second reservoir portion through said second reservoir inlet thereof and accumulates therein, and further wherein fluid accumulated in said second reservoir portion exits said second reservoir portion through said second reservoir outlet thereof, and further wherein when said valve is positioned at a first setting said fluid is directed into said riser portion, and when said valve is positioned at a second setting said fluid is directed away from said hydroelectric device for use outside of said device;

a bulb portion positioned along a length of said riser portion and in fluid communication therewith, said bulb portion having an inlet and an outlet, wherein fluid flowing through said riser portion enters said bulb portion through said inlet and accumulates therein, and further wherein said heat-generation portion is adapted to heat said bulb portion, and further wherein, upon heating, fluid exits said bulb portion via said outlet and flows through a remaining portion of said riser portion;

a steam turbine operably positioned along a length of said riser portion at an elevation wherein fluid within said riser portion is present in the form of steam as a result of the operation of said heat-generating portion, said steam engaging said steam turbine and said steam turbine producing electricity therefrom; and a wind turbine in electrical communication with at least said condenser portion of said hydroelectric device and positioned to be impacted by wind over at least a portion of a day, at least a portion of a quantity of electricity produced by said wind turbine being directed to said condenser portion for the powering thereof.

3. A hydroelectric device comprising:

a closed conduit portion extending from a first elevation to a second elevation; generator;

an exit conduit in fluid communication with said generator portion such that fluid passing through said generator portion is directed into said exit conduit;

a second reservoir portion positioned along a length of said exit conduit and in fluid communication therewith, said reservoir having a second reservoir inlet and a second reservoir outlet;

a valve portion in fluid communication with said exit conduit, said valve having a first setting and a second setting, wherein fluid exiting said generator portion enters said second reservoir portion through said second reservoir inlet thereof and accumulates therein, and further wherein fluid accumulated in said second reservoir portion exits said second reservoir portion through said second reservoir outlet thereof, and further wherein when said valve is positioned at a first setting said fluid is directed into said riser portion, and when said valve is positioned at a second setting said fluid is directed away from said hydroelectric device for use outside of said device;

a bulb portion positioned along a length of said riser portion and in fluid communication therewith, said bulb portion having an inlet and an outlet, wherein fluid flowing through said riser portion enters said bulb portion through said inlet and accumulates therein, and further wherein said heat-generation portion is adapted to heat said bulb portion, and further wherein, upon heating, fluid exits said bulb portion via said outlet and flows through a remaining portion of said riser portion; and a steam turbine operably positioned along a length of said riser portion at an elevation wherein fluid within said riser portion is present in the form of steam as a result of the operation a generator positioned at said second elevation and in fluid communication with said closed conduit portion;

a riser portion extending from a third elevation to a fourth elevation in fluid communication with a turbine such that a fluid passing through said turbine is directed into said riser portion;

wherein said closed conduit portion contains a volume of fluid forming a pressure head therein, said fluid engaging said generator in such a manner as to operate said generator and produce electricity therefrom, and further wherein said riser portion is in fluid communication with said closed conduit portion at substantially a fourth elevation of said riser portion such that vaporized fluid moves from said riser portion into said closed conduit portion in such as manner as to condense to form a liquid for formation of said pressure head therein;

at least one minor attached to said riser portion along a length thereof, said minor adapted to capture sunlight and direct said sunlight at said riser portion and thereby heating said riser portion, said mirror being able to rotate over the course of a day to capture a maximum amount of sunlight at any given time;

a first reservoir portion positioned along a length of said closed conduit portion and in fluid communication therewith, said first reservoir portion having a first reservoir inlet and a first reservoir outlet, wherein fluid flowing through said closed conduit portion enters said first reservoir portion via said first reservoir inlet and accumulates within said first reservoir portion, and further wherein fluid exits said first reservoir portion via said first reservoir outlet and is directed through a portion of said closed conduit portion to said generator, said fluid accumulated within said first reservoir portion contributing to said pressure head acting on said of said heat-generating portion, said steam engaging said steam turbine and said steam turbine producing electricity therefrom.

4. The hydroelectric device according to claim 3, further comprising a condenser fixedly attached to said closed conduit portion and in fluid communication therewith, said condenser adapted to condense water from an atmosphere surrounding said condenser and direct said water into said closed conduit portion.

5. The hydroelectric device according to claim 3, further comprising a photovoltaic array in electrical communication with said hydroelectric device and positioned to receive sunlight over at least a portion of a day, at least a portion of a quantity of electricity produced by said photovoltaic array being directed to said hydroelectric device for the powering thereof.

6. The hydroelectric device according to claim 3, further comprising a wind turbine in electrical communication with said hydroelectric device and positioned to be impacted by wind over at least a portion of a day, at least a portion of a quantity of electricity produced by said wind turbine being directed to said hydroelectric device for the powering thereof.

7. A hydroelectric device comprising:
a closed conduit portion extending from a first elevation to a second elevation;
a generator positioned at said second elevation and in fluid communication with said closed conduit portion;
a riser portion extending from a third elevation to a fourth elevation in fluid communication with a turbine such that a fluid passing through said riser portion is directed to said turbine;
wherein said closed conduit portion contains a volume of fluid forming a pressure head therein, said fluid engaging said generator in such a manner as to operate said generator portion and produce electricity therefrom, and further wherein said riser portion is in fluid communication with said closed conduit portion at substantially a fourth elevation of said riser portion such that vaporized fluid moves from said riser portion into said closed conduit portion in such as manner as to condense to form a liquid for formation of said pressure head therein;
at least one minor attached to said riser portion along a length thereof, said minor adapted to capture sunlight and direct said sunlight at said riser portion and thereby heating said riser portion, said at least one minor being rotatably attached to said riser portion such that said at least one minor is able to rotate over the course of a day to capture a maximum amount of sunlight at any given time;
a first reservoir portion positioned along a length of said closed conduit portion and in fluid communication therewith, said first reservoir portion having a first reservoir inlet and a first reservoir outlet, wherein fluid flowing through said closed conduit portion enters said first reservoir portion via said first reservoir inlet and accumulates within said first reservoir portion, and further wherein fluid exits said first reservoir portion via said first reservoir outlet and is directed through a portion of said closed conduit portion to said generator portion, said fluid accumulated within said first reservoir portion contributing to said pressure head acting on said generator portion;
an exit conduit in fluid communication with said generator portion such that fluid passing through said generator portion is directed into said exit conduit;
a second reservoir portion positioned along a length of said exit conduit and in fluid communication therewith, said reservoir having a second reservoir inlet and a second reservoir outlet;
a valve portion in fluid communication with said exit conduit, said valve having a first setting and a second setting, wherein fluid exiting said generator enters said second reservoir portion through said second reservoir inlet thereof and accumulates therein, and further wherein fluid accumulated in said second reservoir portion exits said second reservoir portion through said second reservoir outlet thereof, and further wherein when said valve is positioned at a first setting said fluid is directed into said riser portion, and when said valve is positioned at a second setting said fluid is directed away from said hydroelectric device for use outside of said device;
a bulb portion positioned along a length of said riser portion and in fluid communication therewith, said bulb portion having an inlet and an outlet, wherein fluid flowing through said riser portion enters said bulb portion through said inlet and accumulates therein, and further wherein said heat-generation portion is adapted to heat said bulb portion, and further wherein, upon heating, fluid exits said bulb portion via said outlet and flows through a remaining portion of said riser portion.

8. The hydroelectric device of claim 7, wherein the hydroelectric device is a free-standing structure and is not part of a separate structure.

* * * * *

UNITED STATES PATENT AND TRADEMARK OFFICE
CERTIFICATE OF CORRECTION

PATENT NO. : 7,854,119 B2  
APPLICATION NO. : 11/774597  
DATED : December 21, 2010  
INVENTOR(S) : David Joseph Strain Page 1 of 1

It is certified that error appears in the above-identified patent and that said Letters Patent is hereby corrected as shown below:

Column 11, line 58, change "minor" to --mirror--;
    line 59, change "minor" to --mirror--.

Column 13, line 20, change "minor" to --mirror--;
    line 21, change "minor" to --mirror--.

Column 14, line 27, delete "generator;";
    line 60, after the words 'the operation', add --of said heat-generating portion, said steam engaging said steam turbine and said steam turbine producing electricity therefrom;--

Column 15, line 11, change "minor" to --mirror--;
    line 12, change "minor" to --mirror--;
    line 28, after the word 'said', add --generator-- and delete the words "of said heat-generating portion, said steam engaging said steam turbine and said steam turbine producing electricity therefrom".

Column 16, line 9, change "minor" to --mirror--;
    line 10, change "minor" to --mirror--;
    line 12, change "minor" to --mirror--;
    line 14, change "minor" to --mirror--;

Signed and Sealed this
Twenty-second Day of May, 2012

David J. Kappos
*Director of the United States Patent and Trademark Office*